United States Patent [19]
Lambert et al.

[11] Patent Number: 5,607,882
[45] Date of Patent: Mar. 4, 1997

[54] MULTI-COMPONENT ELECTRONIC DEVICES AND METHODS FOR MAKING THEM

[75] Inventors: William R. Lambert, Chester; John D. Weld, Succasunna, both of N.J.

[73] Assignee: Lucent Technologies Inc., Murray Hill, N.J.

[21] Appl. No.: 359,973

[22] Filed: Dec. 20, 1994

[51] Int. Cl.⁶ .................................................. H01L 21/60
[52] U.S. Cl. ........................ 437/209; 437/211; 437/212; 437/216
[58] Field of Search ................................ 437/205, 211, 437/212, 216, 217; 257/704, 723, 724, 725

[56] References Cited

U.S. PATENT DOCUMENTS

| | | | |
|---|---|---|---|
| 4,810,671 | 3/1989 | Bhattacharyya et al. | 437/209 |
| 4,810,672 | 3/1989 | Schwarzbauer | 437/209 |
| 4,830,979 | 5/1989 | Crowe et al. | |
| 5,053,358 | 10/1991 | Crowe et al. | |
| 5,086,018 | 2/1992 | Conru et al. | 437/212 |
| 5,179,039 | 1/1993 | Ishida et al. | 437/211 |
| 5,215,472 | 5/1993 | DelPrete et al. | |
| 5,331,235 | 7/1994 | Chun | 257/723 |
| 5,447,888 | 9/1995 | Takashima et al. | 437/212 |
| 5,483,024 | 1/1996 | Russell et al. | 257/723 |

OTHER PUBLICATIONS

S. Lenoard Spitz, *Designer Thermoplastics Resist High Heat*, Electronic Packaging & Production, Oct., 1987, pp. 56–58.

J. G. Sommer, *Molding of Rubber for High Performance Applications*, Rubber Chem. Technol., Jul.–Aug. 1985, pp. 662–683.

Kaushik S. Akkapeddi, *The Design of Some Novel 0.050–In. Grid High–Density Circuit Pack–to–Backplane Connectors*, Proceedings: 39th Electronic Components Conf., May, 1989, pp. 92–98.

W. L. Brodsky et al., *Featured Elastomer Design for Connector Applications*, Proceedings: 43rd Electronic Components and Technology Conf., 1993, pp. 465–467.

A. Spencer, *Elastomeric Connectors – A Flexible Friend?*, New Electronics, Jun. 26, 1984, pp. 56–59.

C. A. Dalamangas, et al., *Testing Proves Conductive Elastomeric Connector Reliability*, 8th Annual Connector Symposium, Oct., 1975, pp. 177–190.

Bruce Freyman, et al., *Overmolded Plastic Pad Array Carriers (OMPAC): A Low Cost, High Interconnect Density IC Packaging Solution for Consumer and Industrial Electronics*, 41st Electronic Components and Technology Conf., 1991, pp. 176–182.

*Primary Examiner*—Kevin Picardat

[57] ABSTRACT

Electronic devices include at least two electronic components in electrical contact by connector means, the components being at least partially encased by a molded resin. Preferably, the connector means is a compression connector and the molded resin maintains a compressive force on the connector to ensure that reliable contact is maintained.

20 Claims, 5 Drawing Sheets

MULTI-COMPONENT ELECTRONIC DEVICES AND METHODS FOR MAKING THEM

TECHNICAL FIELD

This disclosure relates generally to electronic devices having at least two components interconnected by electrical connectors. More specifically, this disclosure relates to multi-component electrical devices wherein the components are at least partially encased in a molded resin.

BACKGROUND

Electronic devices generally include a plurality of components in electrical contact. For example, a simple electronic device may include a circuit board as a first component and a display (e.g., an LCD display) as a second component. Other more complex electronic devices may include several circuit boards, displays and/or I/O devices.

Electrical contact between the components can be accomplished in a variety of ways. For example, rigid metal contacts can be provided and made secure by soldering. As another example, compression connectors may be used to provide electrical connections between the components. To ensure reliable contact between the components, compression connectors must be maintained in a compressed state. Set screws or other mechanical fasteners are commonly used to secure the components together and maintain the compression connectors in a compressed state.

In assembling an electronic device which includes compression connectors, the components are normally aligned with the compression connector positioned between the components. Set screws or other securement devices are then applied to hold the components together. The assembled components can then be placed within and secured to a housing. Normally, a two-part housing is employed requiring an additional step to secure the two halves of the housing together.

The completed electronic device will perform satisfactorily only if the connections between the components provide reliable contact. Thus, the assembly of the device must be performed with precision. In addition, the reliability of the connections can be compromised by jostling during shipping or handling, or when the device is dropped onto a hard surface.

As the foregoing discussion demonstrates, assembly of multi-component electronic devices may be very labor-intensive and the reliability of the connections between the components of the device is subject to great variability. It would be desirable to provide a more efficient method of assembling the components of a multi-component electronic device, particularly those employing compression connectors, in a manner which provides reliable connections, and mechanically and environmentally robust electronic devices.

SUMMARY

Electronic devices in accordance with this disclosure include at least two components in electrical contact by connector means, the components being at least partially encased by a molded, monolithic resin component. In particularly useful embodiments, the connector means is a compression connector and the resin component maintains the compressive force necessary to ensure the connector provides reliable electrical contact.

In another aspect, a method for producing electronic devices has been discovered wherein at least two components of an electronic device with a connector therebetween are placed between two halves of a mold. When the mold halves close, the components are captured within the mold cavity and are placed into close proximity, completing an electrical interconnection. A resin material is then introduced into the mold cavity and hardens to fully or partially encase the components. When the finished device is removed from the mold, the components are held together by the hardened resin.

BRIEF DESCRIPTION OF THE DRAWINGS

Various embodiments are described herein with reference to the drawings wherein.

DETAILED DESCRIPTION OF THE PREFERRED EMBODIMENTS

Figure 1:
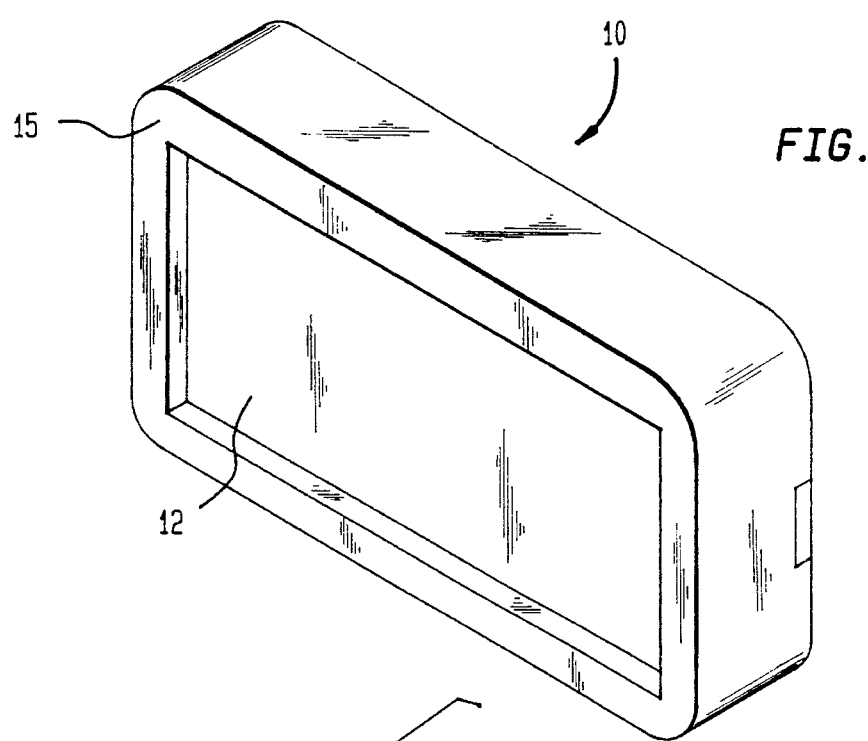
FIG. 1 is a perspective view of an electronic device made in accordance with this disclosure.

Referring to FIG. 1, an electronic device is generally denoted by the numeral 10 and includes at least two components, such as display 12 and a second component not visible in FIG. 1 but discussed hereinafter, and a molded, monolithic resin component 15 which at least partially encases the two components. Unless the context indicates otherwise, the term "resin" as used herein is intended to embrace any natural or synthetic polymer capable of being molded. The term "electronic device" as used herein is intended to embrace both finished consumer products as well as modular devices or parts to be incorporated into products. The term "electronic component" as used herein is intended to embrace any type of structure which is incorporated into an electronic device and is electronically connected to another structure in the device. Such components include, but are not limited to printed wiring boards, integrated circuits, discrete components, connectors, flex circuits, displays, I/O interfaces, keypads and other input devices, and housings.

Figure 2:
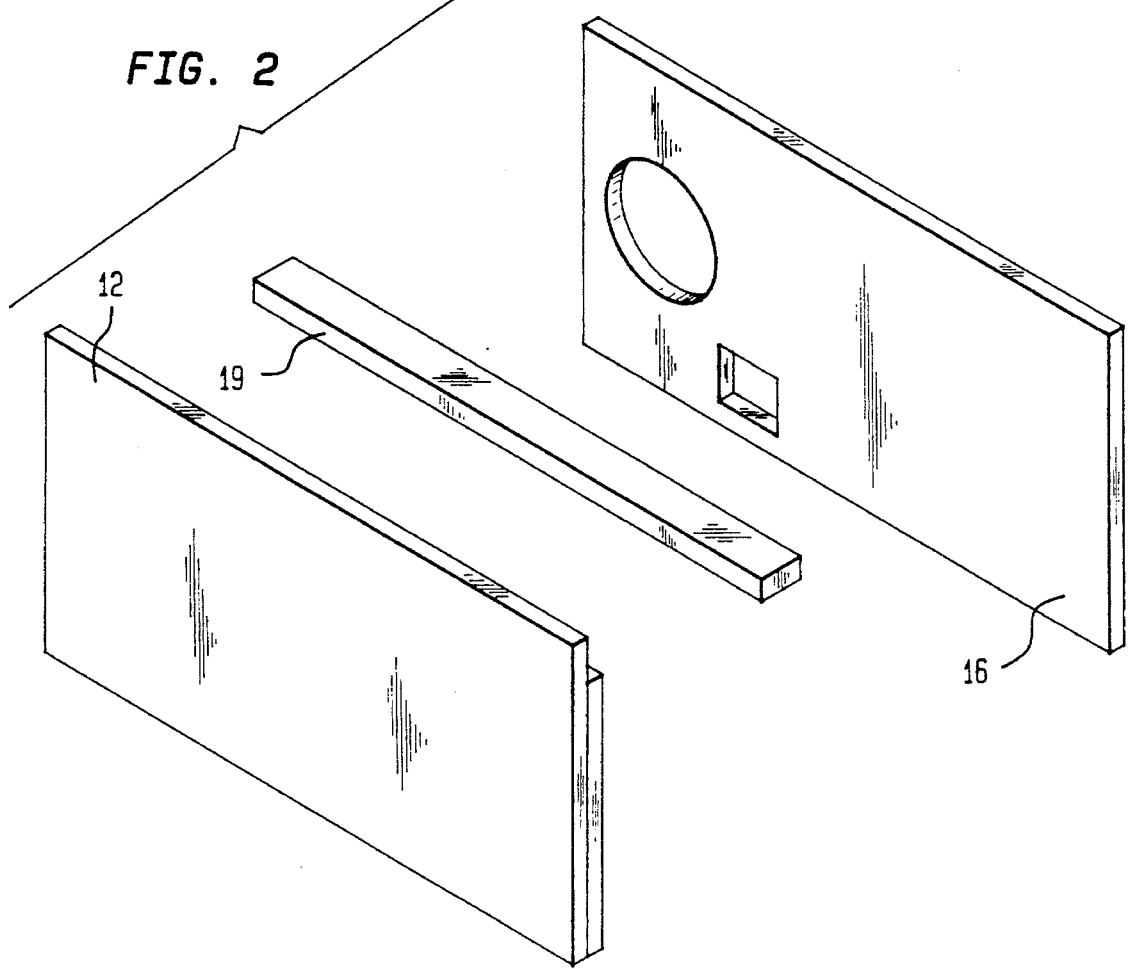
FIG. 2 is an exploded perspective view of components useful in making a device in accordance with this disclosure prior to molding.

To make electronic device 10, display 12 and a circuit board 16 are aligned as shown in FIG. 2 with a compression connector 19 positioned therebetween. While an elastomeric compression connector is shown in FIG. 2, any of the other types of compression connectors known to those skilled in the art may be employed. In addition, known types of rigid connectors, though less preferred, can be employed.

Figure 3:
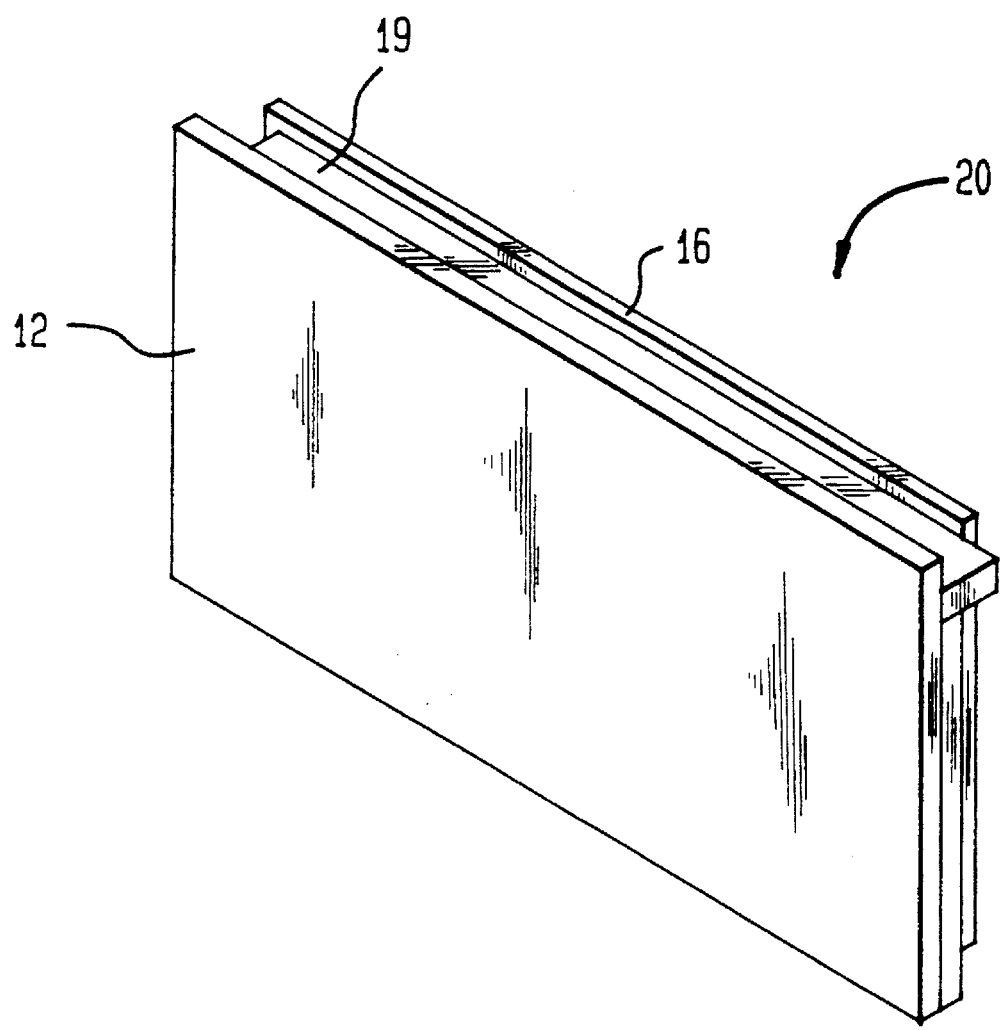
FIG. 3 is a perspective view of a stacked assembly of the components of FIG. 2 prior to molding.

As best seen in FIG. 3, stacked assembly 20 is prepared by positioning the display 12 and circuit board 16 onto either side of connector 19. Where a rigid connector is employed, the electrical contact can be secured once the assembly is prepared. Self-securing connectors (e.g., pin and socket, press fit, etc.) are particularly useful rigid connectors for use in the present methods and devices since such connectors can be assembled by the closing of a mold around the assembly, effectively eliminating the need to employ a separate securing step.

Figure 4:
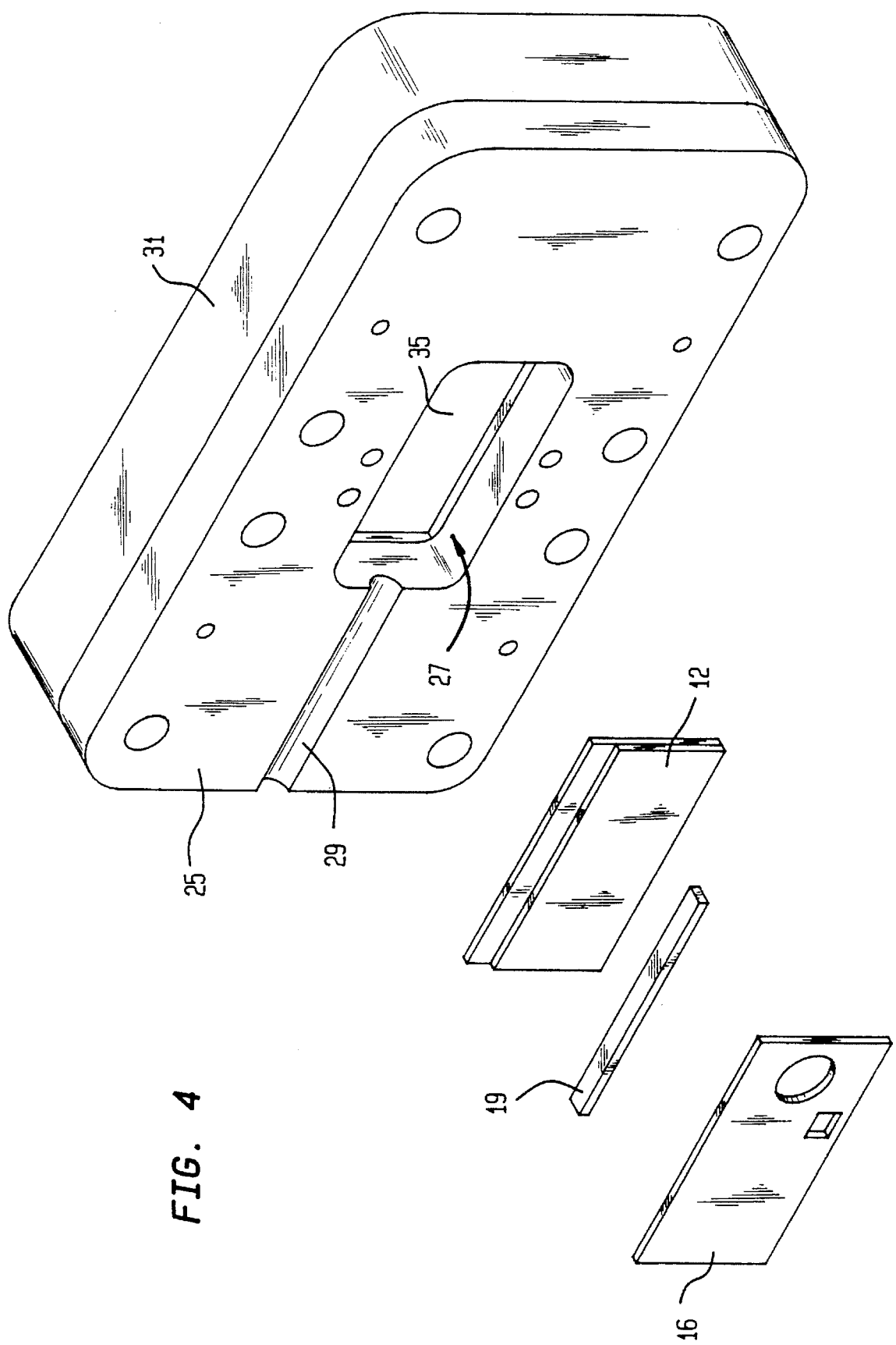
FIG. 4 is a perspective view of a mold half useful in making electronic devices in accordance with this disclosure.

Stacked assembly 20 is then placed into mold 25 shown in FIG. 4 so that a resin can be introduced into the mold to at least partially encase the stacked assembly. Mold 25 includes a cavity 27 which is dimensioned and configured to receive stacked assembly 20. Precision alignment is not required during preparation of stacked assembly 20, since the side walls of mold cavity 27 will serve as alignment means. It is also contemplated that the mold can be provided with pins (not shown) or other alignment means to ensure proper alignment of the components within mold cavity 27. Where alignment means are provided, it is further contemplated that the components may be individually positioned in the mold cavity, rather than as a stacked assembly.

As is conventional in molding devices, mold 25 includes one or more runners 29 for delivering molten or uncured resin to cavity 27 and is mounted to a platen 31. A second mold half (not shown) can be moved into contact with mold 25 to provide an enclosed cavity into which resin can be introduced. The closing of the mold halves provides the compressive force necessary to ensure reliable electrical connection between the components. Optionally, one or both of the mold halves can be provided with pins (not shown) which extend into cavity 27 such that upon closing of the mold halves circuit board 16 and display 12 are pressed together by the pins, thereby compressing connector 19.

The configuration of the mold halves is not critical provided that the cavity formed by the mold halves is large enough to accommodate the stacked assembly in a manner that the components making up the stacked assembly will be at least partially encased and held together by resin introduced into the cavity. The mold may be provided with structures to impart desired features to the molded resin component 15. Such structures can, for example, produce information indicia, handles, slots, windows, or any other features commonly present in plastic housings. For example, mold 25 includes raised portion 35 against which display 12 is placed when the stacked assembly 20 is placed within mold 25. Raised portion 35 forms a window in molded resin component 15 to allow viewing of display 12 in the final electronic device 10. Once the mold halves close, connector 19 is compressed by the mold halves and the components are held in proper alignment with display 12 pressed against raised portion 35 of mold 25.

The molds may include other features conventionally found in molding devices such as, for example, alignment pins, ejector pins, channels for accommodating cooling fluids, and baffles or other means for directing the flow of resin.

Resin is introduced into the mold cavity to form a monolithic resin component 15 that partially encases the electronic components of the device. Preferably, the resin is introduced into the mold while in a fluid (e.g., molten or uncured) state. The resin employed can be any of the resins commonly employed in molding applications. Preferably, the resins are moldable at temperatures below about 500° F. Exposure of the components to such temperatures generally does not adversely affect the components since most electronic components are designed to be exposed to temperatures employed in soldering which can range from 350° F. to 600° F. for short periods of time. Suitable resins for molding include any of the known thermoplastic resins such as, for example, polyolefins, polyamides, polyesters, fluoropolymers, polyacrylates, polyacetates, polycarbonates, polyurethanes, polystyrenes, polyacrylonitriles, liquid crystal polymers or any other engineering thermoplastic. Also suitable are a wide range of thermosetting resins, including, but not limited to epoxy resins, such as, for example, expoxy-novolacs, thermosetting polyester resins, and thermosetting polyimides. Additionally, the strength of the resulting molded resin component may be increased by using a resin having a particulate (e.g., fibrous or spherical) filler incorporated therein.

The resin may, but not necessarily, fill all voids between the components. Known molding processes such as gas assist or co-injection foam molding may be employed to achieve substantially complete filling of any voids or inter-component gaps. By completely encasing the components, the resin locks the components into a desired position and the resulting electronic device is much more mechanically robust and less likely to be damaged during handling or if dropped. If all voids between components are not filled by the resin, structural supports (not shown) may be provided on the components to assist the assembly in withstanding the compressive forces from the mold or forces from the flow of resin. Alternatively, it is contemplated that a inter-component gap filler (not shown), such as, for example, a sheet of material, may be provided between the components during preparation of the stacked assembly. It is also contemplated that the inter-component gap may be eliminated by planarizing the components, for example, by applying a pre-coat to one or both sides of each component. Use of structural supports or an inter-component gap filler are a matter of design choice, which may be dictated by cost considerations, e.g., where the cost of the resin material used in molding justifies only partial encasement.

The resin is allowed to harden or cure within the mold. This ensures that molded, monolithic resin component 15 maintains any compressive force necessary for reliable contact to be provided by the connector(s). Being molded directly around the components, resin component 15 also provides a good seal, making the resulting device environmentally robust, e.g., less sensitive to dust, moisture or other environmental contaminants, compared to devices including separately formed housings. Furthermore, the rigid alignment of the components helps eliminate any shearing between them.

It is contemplated that any molding technique may be employed to produce molded, monolithic resin component 15. Such techniques include, by way of exemplification only, injection molding and transfer molding. Those skilled in the art will envision how the present methods can be adapted for these and other molding techniques.

Additionally, while the foregoing discussion related to a two component assembly for making an electronic device, it is contemplated that any number of components could be employed in making electronic devices in accordance with this disclosure. For example, in the embodiment shown in FIGS. 5 and 6, four components 116A, 116B, 116C and 116D are used in the device. Component 116A includes a pair of hook members 117 thereon. Hook members 117 allow component 116A to be suspended on an alignment means, such as rods 118. Prior to suspension on rods 118 a compression connector 119 is secured to component 116A, e.g., by adhesive. Each of components 116B, C and D are likewise provided with hook portions for receiving rods 118.

Figure 5:
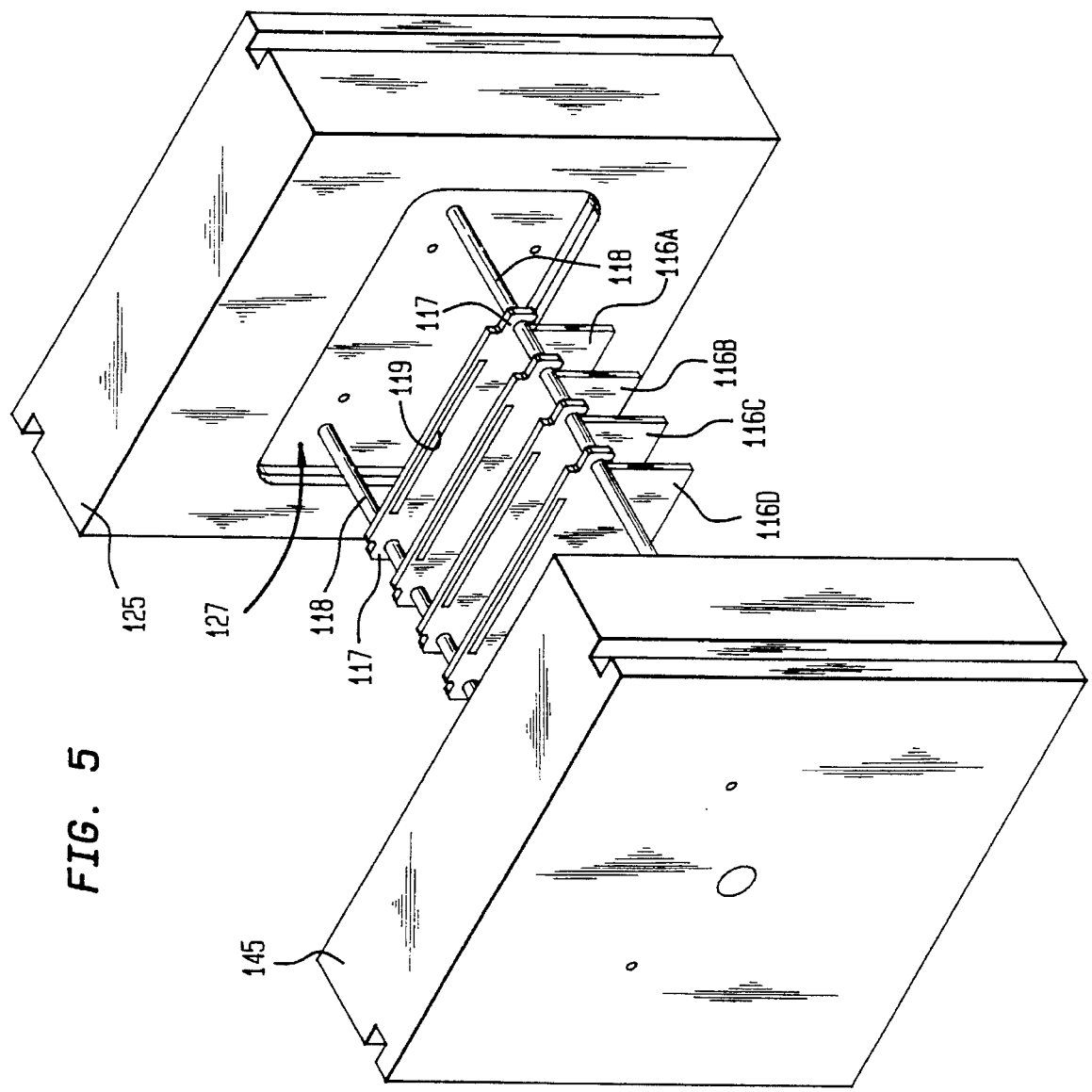
FIG. 5 is a perspective view of another molding apparatus and components useful in making electronic devices in accordance with this disclosure.
Figure 6:
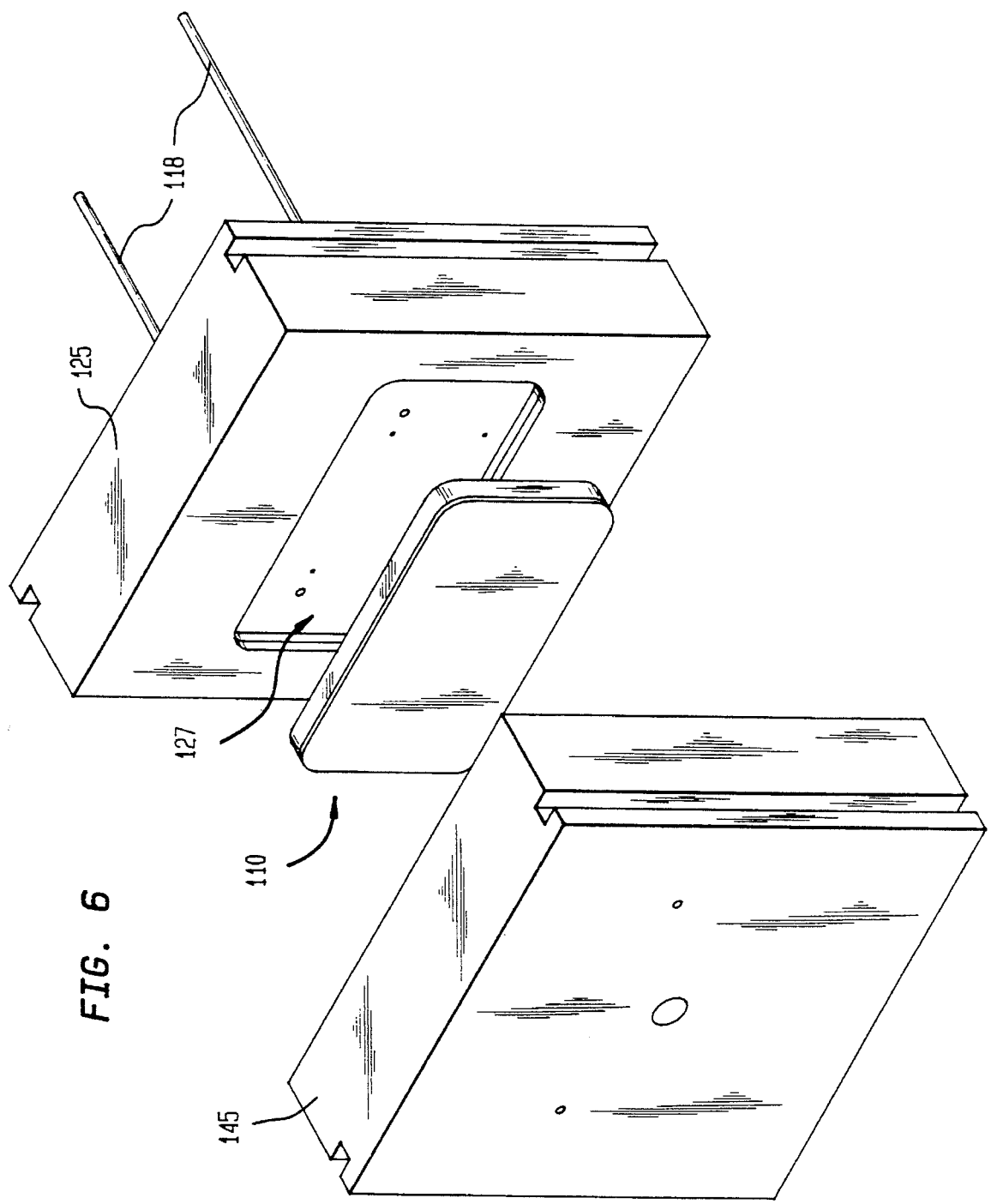
FIG. 6 is a perspective view of the apparatus of FIG. 5 after molding.

As best shown in FIG. 5, when components 116A–D are positioned on rods 118, they are positioned generally between two mold halves 125, 145, at least one of which is moveable. As the mold halves close, they cause components 116A–D to slide along rods 118 until the components are moved into a properly aligned, stacked orientation within mold cavity 127. As the mold halves continue to close, the stacked components are compressed an amount to ensure that reliable connection is provided by compression connectors 119. Once the mold is closed, rods 118 can be withdrawn since the mold halves will hold the components together in the proper orientation. Resin is then introduced into the mold cavity 127. The resin is allowed to harden or cure within the mold. The mold halves are then opened as shown in FIG. 6 and the finished electronic device 110 is removed.

It is further contemplated that the process for making electronic devices in accordance with this disclosure can be substantially automated. Specifically, the sequence of steps, e.g., component aligning, placement into the mold, mold closing, molding, product ejection and transporting the finished product from the mold, can be controlled by a programmable controller. The process shown in FIGS. 5 and 6 is particularly suited to automation. Specifically, components 116A–D can be automatically positioned onto rods 118, e.g., dropped from a conveyor belt or placed by a robotic arm. The sequence of molding steps, e.g., mold closing, withdrawal of rods 118, introduction of resin, opening of the mold, and transporting the finished device away from the molding site can each be computer controlled.

It will be understood that various modifications may be made to the embodiments disclosed herein. For example, where the electronic device is a modular unit to be incorporated into a larger electronic device or assembly, the portion of the components not encased by the molded resin might only be a series of edge connectors. As another example, other layers or coatings, such as an impact absorbing elastomeric coating, may be applied to all or a portion of the device after or concurrently with formation of the molded resin component. As yet another example, foamed resins may be employed in forming the molded resin component. It is also contemplated that conductive adhesive can be used as the connector between the components. Therefore, the above description should not be construed as limiting, but merely as exemplifications of preferred embodiments. Those skilled in the art will envision other modifications within the scope and spirit of the claims appended hereto.

What is claimed is:

1. A method of manufacturing an electronic device comprising:

providing a stacked assembly of a first electronic component, a second electronic component and an electrical connector therebetween to provide electrical contact between the first and second electronic components;

positioning the stacked assembly into a mold cavity between two approximating the mold surfaces in a manner to compress the stacked assembly; and introducing a resin into the mold cavity to at least partially encase the stacked assembly and to maintain the electrical connector in a compressed state.

2. A method as in claim 1 wherein the electrical connector is a compression connector and the step of placing stacked assembly into a mold cavity comprises placing the stacked assembly between two mold halves and the step of approximating the mold surfaces comprises closing the mold halves to compress the stacked assembly.

3. A method as in claim 1 to wherein any voids which may be present between the first and second components of the stacked assembly are filled with the resin.

4. A method as in claim 1, wherein the molding step comprises injection molding.

5. A method as in claim 1, wherein the resin is selected from the group consisting of thermoplastic and thermosetting resins.

6. A method as in claim 1 wherein one or more of the steps are automated.

7. A method as in claim 1 wherein the step of providing a stacked assembly includes the step of at least partially filling a gap between the first and second components.

8. A method as in claim 7 wherein the step of at least partially filling a gap between the first and second components comprises planarizing at least one side of at least one of the components.

9. A method as in claim 7 wherein the step of at least partially filling gap between the first and second components comprises providing an inter-component gap filler between the components.

10. In a method of making an electronic device comprising compressing an electronically conductive compression connector between a first and second electronic component, the improvement comprising:

maintaining the compression connector in a compressed state to provide electrical contact between the first and second electronic components by at least partially encasing the first and second electronic components in a monolithic resin component molded around the first and second electronic components.

maintaining the compression connector in a compressed state by at least partially encasing the first and second electronic component in a monolithic resin component molded around the first and second electronic component.

11. A method as in claim 10 wherein the compression connector is an elastomeric connector.

12. A method as in claim 10 wherein any voids between the first and second electronic component are filled by the resin component.

13. A method as in claim 10 further comprising the step of planarizing at least one side of at least one of the components.

14. A method as in claim 10 wherein the step of maintaining the compression connector in a compressed state comprises:

providing a stacked assembly of the first electronic component, the second electronic component and the connector;

placing the stacked assembly into a mold cavity; and introducing resin into the mold cavity to at least partially encase the stacked assembly.

15. A method as in claim 14 wherein the step of placing stacked assembly into a mold cavity comprises placing the stacked assembly between two mold halves and closing the mold halves to compress the stacked assembly.

16. A method of fabricating an electronic device comprising:

positioning at least a first and second component with a connector therebetween on alignment means between two mold halves which are in a first open position;

moving the two mold halves to a second, closed position whereby the first and second components and the connector are moved into contact with each other such that an electrical connection is made between the components and the components are enclosed within a mold cavity formed by the mold halves; and introducing resin into the mold cavity to at least partially encase the components.

17. A method as in claim 16, wherein the mold halves exert a compressive force on the components upon moving toward the second, closed position.

18. A method as in claim 16 wherein the alignment means comprises at least one rod and the step of positioning comprises hanging the at least first and second components on the rod.

19. A method as in claim 16 further comprising the step of removing the alignment means prior to the step of introducing resin into the mold.

20. A method as in claim 16 wherein the step of positioning comprises adhering a connector to at least one of the components.

* * * * *

UNITED STATES PATENT AND TRADEMARK OFFICE
CERTIFICATE OF CORRECTION

PATENT NO. : 5,607,882
DATED : March 4, 1997
INVENTOR(S) : William R. Lambert et al.

It is certified that error appears in the above-identified patent and that said Letters Patent is hereby corrected as shown below:

Column 6,
Line 21, Claim 10 should read:

10. In a method of making an electronic device comprising compressing an electronically conductive compression connector between a first and second electronic component, the improvement comprising:

maintaining the compression connector in a compressed state to provide electrical contact between the first and second electronic components by at least partially encasing the first and second electronic components in a monolithic resin component molded around the first and second electronic components.

Signed and Sealed this

Eleventh Day of November, 2003

JAMES E. ROGAN
*Director of the United States Patent and Trademark Office*